US012750782B2

(12) United States Patent
Abotabl et al.

(10) Patent No.: US 12,750,782 B2
(45) Date of Patent: Sep. 29, 2026

(54) MULTIPLE CELL WAKE UP SIGNALLING OCCASIONS FOR USER EQUIPMENT REQUESTS

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/356,698

(22) Filed: Jul. 21, 2023

(65) Prior Publication Data

US 2025/0031149 A1 Jan. 23, 2025

(51) Int. Cl.
*H04W 52/02* (2009.01)
*H04W 72/1268* (2023.01)

(52) U.S. Cl.
CPC ... *H04W 52/0235* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 2017/0208619 | A1* | 7/2017 | Yang | H04W 72/21 |
| 2017/0332327 | A1* | 11/2017 | Fang | H04L 5/0007 |
| 2018/0041961 | A1* | 2/2018 | Huang | H04W 52/0229 |
| 2022/0264464 | A1* | 8/2022 | Seo | H04W 72/23 |
| 2022/0386240 | A1* | 12/2022 | Xu | H04W 52/0229 |
| 2023/0199649 | A1 | 6/2023 | Kwak et al. | |
| 2024/0373431 | A1* | 11/2024 | Marinier | H04W 72/21 |
| 2025/0056414 | A1* | 2/2025 | Ma | H04W 68/025 |

FOREIGN PATENT DOCUMENTS

| | | | |
|---|---|---|---|
| WO | WO-2023048634 | A1 | 3/2023 |
| WO | WO-2024135591 | A1 | 6/2024 |

OTHER PUBLICATIONS

International Search Report and Written Opinion—PCT/US2024/035848—ISA/EPO—Oct. 28, 2024.

* cited by examiner

*Primary Examiner* — Anh Ngoc M Nguyen
(74) *Attorney, Agent, or Firm* — Holland & Hart LLP

(57) ABSTRACT

A method and apparatus for communication by a user equipment, the method comprising receiving a configuration of a plurality of cell wake up signaling occasions in which the user equipment can transmit cell wake up signaling to a network entity, whereby each of the plurality of cell wake up signaling occasions is associated with at least one function, and wherein each of the plurality of cell wake up signaling occasions has an associated periodicity, and transmitting cell wake up signaling to the network entity during one or more of the plurality of cell wake up signaling occasions, using the received configuration.

28 Claims, 8 Drawing Sheets

MULTIPLE CELL WAKE UP SIGNALLING OCCASIONS FOR USER EQUIPMENT REQUESTS

BACKGROUND

Field of the Disclosure

Aspects of the present disclosure relates generally to wireless communication and more specifically to techniques and apparatuses for network energy saving.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Network energy savings features are critical for adoption & expansion of cellular networks. It is therefore important to identify techniques on the gNB and UE side to improve network energy savings in terms of both BS transmission and reception. There is a need to achieve more efficient operation dynamically and/or semi-statically and finer granularity adaptation of transmissions and/or receptions in one or more of network energy saving techniques in time, frequency, spatial, and power domains, with potential support/feedback from UE, and potential UE assistance information. There is also a need to improve information exchange/coordination over network interfaces.

BRIEF SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one aspect of the present invention there is provided a method for communication by a user equipment (UE), the method comprising receiving a configuration of a plurality of cell wake up signaling (WUS) occasions in which the user equipment can transmit cell wake up signaling to a network entity, whereby each of the plurality of cell wake up signaling occasions is associated with at least one function, and transmitting cell wake up signaling to the network entity during one or more of the plurality of cell wake up signaling occasions, using the received configuration.

By associating each cell wake up signaling occasion with a function, the UE may transmit cell wake up signaling for a particular purpose (which for example could be, but not limited to, one of obtaining an uplink (UL) grant, for the network entity to move from an inactive state to an active state, or obtaining a Synchronization Signal Block (SSB) or a System Information Block #1 (SIB1)) in one or more occasion of the a plurality of cell wake up signaling (WUS) occasions, that is configured for that purpose.

The plurality of cell wake up signaling occasions may comprise a first wake up signaling occasion associated with a first function and at a second wake up signaling occasion associated with a second function, wherein the first function and the second function are different. One example of the first function and the second function being different would be where the first cell wake up signaling occasion is associated with one type of request and the second wake up signaling occasion is associated with another (different) type of request. Put another way, the first cell wake up signaling occasion may have one purpose and the second wake up signaling occasion may have another (different) purpose.

The at least one function may be associated with at least one of a scheduling request requesting an uplink grant; a request for the network entity to move from an inactive state to an active state; a request for a Synchronization Signal Block; or a request for a System Information Block #1.

At least one of the plurality of cell wake up signaling occasions may be associated with a plurality of functions.

The transmitted cell wake up signaling may comprise a plurality of requests of the network entity.

Each of the plurality of requests may be transmitted in a different cell wake up occasion of the plurality of cell wake up occasions. Alternatively, at least two of the plurality of requests may be transmitted in the same cell wake up occasion of the plurality of cell wake up occasions. At least two of the plurality of requests may be transmitted simultaneously.

Each of the plurality of cell wake up occasions may be designated for a specific type of cell wake up signaling.

The step of transmitting cell wake up signaling to a wireless network may comprise transmitting at least one one bit indication. The cell wake up signaling may be transmitted over a physical random access channel (PRACH).

The cell wake up signaling may comprise at least one of a scheduling request requesting an uplink (UL) grant. a request for the network entity to move from an inactive state to an active state, a request for a Synchronization Signal Block (SSB), or a request for a System Information Block #1 (SIB1).

Transmitting the cell wake up signaling may comprise transmitting the cell wake up signaling in a cell wake up occasion having a function associated with a type of cell wake up signaling to be transmitted.

The cell wake up signaling may comprise two or more requests of the type including but not limited to a scheduling request requesting an uplink (UL) grant, a request for the network entity to move from an inactive state to an active state, a request for a Synchronization Signal Block (SSB), or a request for a System Information Block #1 (SIB1).

The same cell wake up signaling may be transmitted in two or more of the plurality of cell wake up occasions. Each of the plurality of cell wake up occasions may have a different power control configuration. Each of the plurality of cell wake up occasions may have a different priority. Each of the plurality of cell wake up occasions may have a different periodicity. The periodicity of at least one of the plurality of cell wake up signaling occasions may align with a periodicity of active periods of the network entity. In this case, the same cell wake up signaling may be transmitted in two or more of the plurality of cell wake up occasions defined during the active period of the network entity.

Each of the plurality of cell wake up occasions may have a different power control configuration. Each of the plurality of cell wake up occasions may have a different priority. Each of the plurality of cell wake up occasions may have a different periodicity.

At least one of the plurality of cell wake up occasions may be configured in each active period of the network entity. At least one of the plurality of cell wake up occasions may be configured in alternate active periods of the network entity. At least of one of the plurality of cell wake up occasions defined during the subsequent active period of the network may not be configured during the earlier active period of the network entity.

A cell wake up signaling occasion that can be used by the UE to request the network to move from an inactive state to an active state may be configured in each active period of the network entity. A cell wake up signaling occasion that can be used by the user equipment to request at least one of: an uplink grant; a Synchronization Signal Block; or a System Information Block #1, may be configured in alternate active periods of the network entity.

The method may further comprise receiving one response message from the network entity in response to all of the plurality of requests.

In accordance with one aspect of the present invention there is provided a method for communication by a network entity, the method comprising receiving cell wake up signaling from a user equipment in one of a plurality of cell wake up occasions, wherein each cell wake up occasion is associated with at least one function, and wherein each of the plurality of cell wake up signaling occasions has an associated periodicity. The plurality of cell wake up signaling occasions may comprise a first wake up signaling occasion associated with a first function and at a second wake up signaling occasion associated with a second function, wherein the first function and the second function are different.

The cell wake up signaling may comprise a plurality of requests of the network entity. Each of the plurality of requests may be received in a different cell wake up occasion of the plurality of cell wake up occasions. Receiving cell wake up signaling from the user equipment may comprise receiving at least one one bit indication.

The method may further comprise transmitting one response message to the user equipment in response to all of the plurality of requests.

In accordance with one aspect of the present invention there is provided a user equipment comprising means for receiving a configuration of a plurality of cell wake up signaling occasions in which the user equipment can transmit cell wake up signaling to a network entity, whereby each of the plurality of cell wake up signaling occasions is associated with at least one function, and wherein each of the plurality of cell wake up signaling occasions has an associated periodicity, and means for transmitting cell wake up signaling to the network entity during one or more of the plurality of cell wake up signaling occasions, using the received configuration.

In accordance with one aspect of the present invention there is provided a network entity, comprising means for receiving cell wake up signaling from a user equipment in one of a plurality of cell wake up occasions, wherein each cell wake up signaling occasion is associated with at least one function, and wherein each of the plurality of cell wake up signaling occasions has an associated periodicity.

In accordance with one aspect of the present invention there is provided a non-transitory computer-readable medium storing instructions which, when executed by a computer, cause the computer to perform the method of receiving a configuration of a plurality of cell wake up signaling (WUS) occasions in which the user equipment can transmit cell wake up signaling to a network entity, whereby each of the plurality of cell wake up signaling occasions is associated with at least one function, and wherein each of the plurality of cell wake up signaling occasions has an associated periodicity; and transmitting cell wake up signaling to the network entity during one or more of the plurality of cell wake up signaling occasions, using the received configuration.

In accordance with one aspect of the present invention there is provided a non-transitory computer-readable medium storing instructions which, when executed by a computer, cause the computer to perform the method of receiving cell wake up signaling from a user equipment in one of a plurality of cell wake up occasions, wherein each cell wake up occasion is associated with at least one function, and wherein each of the plurality of cell wake up signaling occasions has an associated periodicity.

The apparatus according to preferred embodiments is described as configured or arranged to or simply 'to' carry out certain functions. This configuration or arrangement could be by use of hardware or middleware or any other suitable system. The apparatus may comprise one or more processors and processes of the apparatus may be performed by a single processor or by multiple processors in combination. A single processor may therefore perform one or more of the processes of the apparatus. The memory and the one or more processors are communicably connected, for example, via a bus. The one or more processors may store and retrieve information from the memory, such as for example, intermediate data generated when performing the processes of the apparatus.

Aspects of the invention may be implemented in digital electronic circuitry, or in computer hardware, firmware, software, or in combinations of them. Aspects of the invention may be implemented as a computer program or computer program product, e.g., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a standalone program or as a module, component, subroutine, or other unit suitable for use in a data processing environment. A computer program may be deployed to be executed on one module or on multiple modules at one site or distributed across multiple sites and interconnected by a communication network.

Method steps according to aspects of the invention may be performed by one or more programmable processors executing a computer program to perform functions of the invention by operating on input data and generating output. An apparatus according to aspects of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope, which is defined in the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
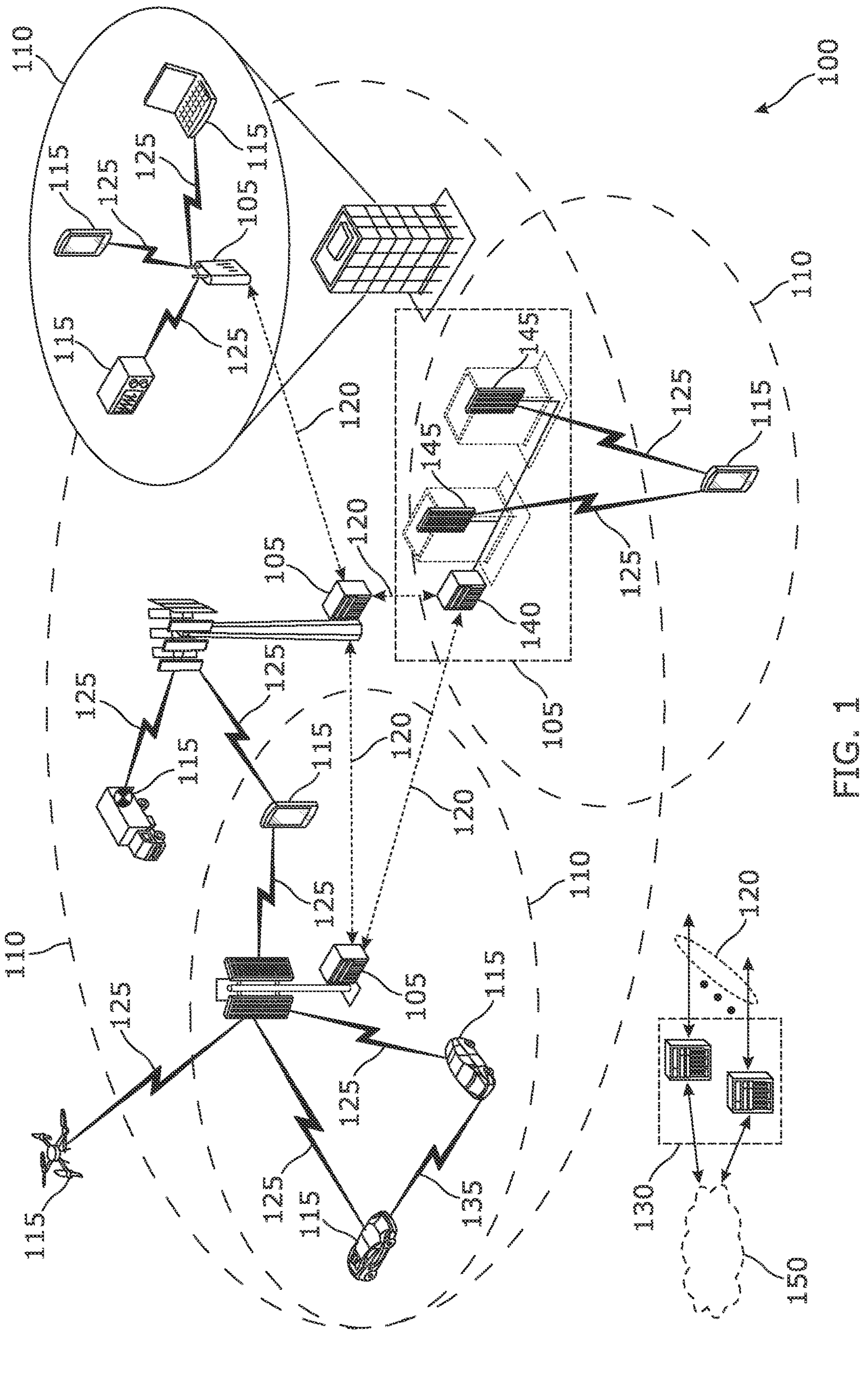
FIG. 1 is a diagram illustrating an example of a wireless communications system and an access network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In recent years following the advent of 5G/NR technology, a growing concern has arisen regarding the amount of power consumed by cellular networks. For example, 5G massive MIMO (mMIMO) technology, which enables an increase in data throughput compared to LTE MIMO technology (e.g., based on a larger number of antennas for transmission (Tx) or reception (Rx) and other factors), results in significantly higher power consumption than its earlier counterpart. Moreover, growing environmental factors such as carbon emissions also contribute to an increase in power consumed. As a result, the power consumption of cellular networks may significantly affect network operator expenditures (OPEX).

To help reduce the power consumption and associated OPEX, efforts by the network have been taken to achieve network energy savings. To this end, aspects of the present disclosure provide multiple cell wake up signaling occasions for different user equipment requests for network energy savings.

FIG. 1 illustrates an example of a wireless communications system 100 in which the method and apparatus of the present invention may be used. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As indicated above, FIG. 1 is provided as an example. Other examples may differ from that which is described in FIG. 1.

Recent advancements in wireless technologies allowing for more connected mobile devices and/or always-on devices have caused a need for power savings on the network side. Some wireless network deployments save power on the network side by powering down certain BSs in an area and handing over devices that are connected to the BSs that are to be powered down to other BSs that are remained powered on in the area. While such an approach may allow a network to save power, the UEs are required to be handover to other BSs which may not provide the best performance.

The BS may include one or more sleep periods and one or more awake periods while in the sleep mode. In some examples, the BS may include periodic sleep/awake cycles while in the sleep mode. Accordingly, the BS can power down some components during the sleep periods to save power. For example, the BS can power down at least some radio frequency (RF) components and/or at least some baseband (BB) components that are used for over-the-air (OTA) communications with the UEs. The BS may notify the connected UEs of the start of a sleep mode and an end of the sleep mode via signaling at various layers (e.g., at a physical layer, a media access control (MAC) layer, or a network layer). The BS may configure the UEs with the sleep pattern (e.g., the sleep/awake cycle) used for the sleep mode. Thus, the UEs can synchronize to the BS's sleep mode operations and refrain from transmitting UL communications (e.g., UL data and/or UL control) to the BS during the sleep periods.

While the disclosed embodiments are described in the context of NR networks, the disclosed embodiments can be applied to any wireless communication networks to provide power savings and operational cost reductions. The disclosed embodiments are also suitable for use in a network powered by solar panel, where critical low power supply periods may occur.

Figure 2:
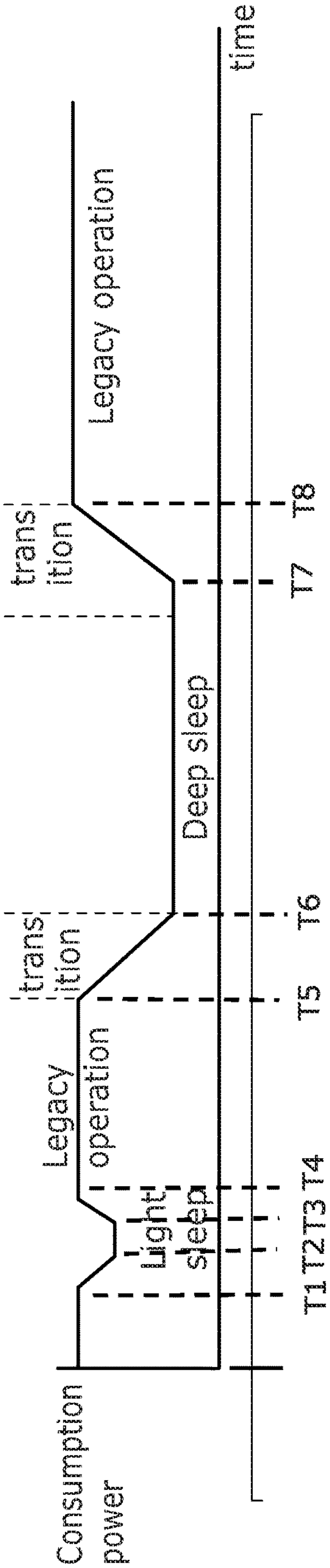
FIG. 2 depicts an example of a network sleep pattern, in accordance with the prior art.

Network power saving takes different modes and operations to save power and maintain network operation. Sleep modes are different in terms of operation: for example, some sleep modes, including a deep sleep mode, will turn off the RF chains while others, for example a light sleep mode, won't. Different sleep modes have different power consumption and require different transition time. FIG. 2 shows an example of a network sleep pattern as a plot of network power consumption over time for a network. At time T0 the network is in a full operation power mode, also referred to as its legacy operation, wherein the network is up and operating. At time T1 the network starts transitioning into a light sleep mode, and remains in the light sleep mode until time T2 when it starts transitioning back to its legacy operation. At time T1 the network starts transitioning into a light sleep mode, and remains in the light sleep mode until time T3 when it starts transitioning back to its legacy operation, reaching the power consumption of the legacy operation at T4. At time T5 the network starts transitioning into a deep sleep mode, and remains in the deep sleep mode until time T7 when it starts transitioning back to its legacy operation, reaching the power consumption of the legacy operation at T8. Periods T1-T2, T3-T4. T5-T6, and T7-T8 represent transition times, which vary depending on the sleep mode.

The network can enter different sleep modes based on traffic. For some certain time during the day (e.g., off-peak times), there may be no traffic or very light traffic load in a cell. However, the cell still has to periodically transmit broadcast signal/channel e.g., SSB and SI, and periodically monitor Physical Random Access Channel (PRACH) occasions for possible Random Access Channel (RACH) or small data transmission (SDT) from a UE. All such periodic transmission and periodic monitoring requires the cell be in an active mode; hence impacting network power consumption without providing useful services.

If the cell knows there are no connected UEs or light traffic load in the cell, it can stop or slow down periodic transmission and periodic monitoring for network power savings by entering a sleep mode. However, the cell should be aware of whether one or more UEs needs to go into connected state or perform some SDT so that it can transition to active mode. Such UEs can proactively wake up the cell by sending some physical layer signal (e.g., PRACH or a Scheduling Request (SR)), which acts as a cell wake up signal (WUS). FIG. 2 is provided as an example. Other examples may differ from that which is described in FIG. 2.

Figure 3:
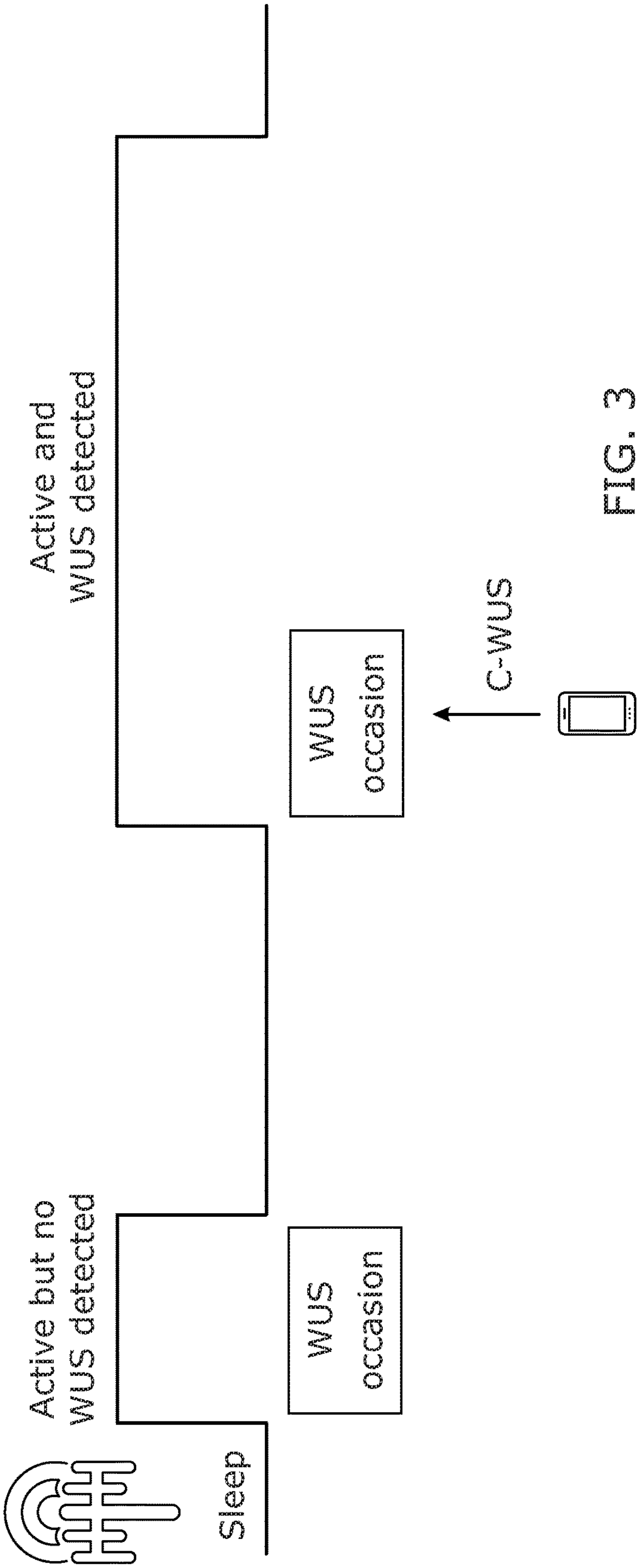
FIG. 3 is a representation of a network sleep pattern showing wake up signal (WUS) opportunities for a UE to wake up the network.

FIG. 3 is a representation of a network sleep pattern showing wake up signal (WUS) opportunities for a UE to wake up the network. Each opportunity takes the form of a cell wake up signaling occasion, which a UE may use to transmit a cell wake up signal to wake up the network. These opportunities are not limited to the active period(s) of the network. Cell wake up signaling occasions can be provided when the network is in a sleep/inactive period or in an active period. In the example of FIG. 3, no cell wake up signal is detected by the network during an active period and the network entity re-enters its sleep mode to save energy. This is because the first WUS opportunity shown in FIG. 3 was not used by any UE to transmit a cell wake up signal. In the subsequent cell WUS occasion, a cell wake up signal is transmitted by a UE and is detected by the network entity, waking the network entity. The UE may be sending a cell wake-up signal to request the network to move from inactive to active state, or to request SSB or SIB1, or to request a grant, or a combination thereof, or the request may be a different type of request. In the example of FIG. 3, multiple or all UEs can use either WUS occasion to transmit one or more wake up signal.

The present invention provides for multiple cell WUS occasions to be defined, in which the user equipment can transmit cell wake up signaling to a network entity, during or outside of a network's active period. Each of the plurality of cell wake up signaling occasions is associated with at least one function For example, each cell WUS occasion can be used by the UE for a specific purpose, allowing more information to be sent utilizing the different occasions. If the UE has multiple requests, it can use more than one cell WUS occasion to send more than one request. Each of the plurality of requests can be transmitted in a different cell wake up signal occasion of the plurality of cell wake up occasions. The requests can be transmitted simultaneously as a result of using a different cell WUS occasion.

The wake up signaling can comprise one or more physical layer signal (e.g., PRACH or a Scheduling Request (SR), Uplink Control Information (UCI), or a new signal). When the PRACH is used, it may be possible to divide preambles into groups and exploit each group to send different messages. Likewise with a PUCCH carrying the scheduling request.

To ensure synchronicity between the UE and the network entity, the UE receives a configuration of the plurality of cell wake up signaling occasions in which the user equipment can transmit cell wake up signaling to the network. As a result, the UE is configured with multiple cell WUS occasions which can be used for different purposes, for example, to activate the network or request SSB or SIB1 or ask for a grant. The UE does not have to be RACH connected to the network entity.

In an embodiment, each of the plurality of cell wake up occasions is designated for a specific type of cell wake up signaling. In other embodiments, at least one cell WUS occasion may be used for any type of cell wake up signaling. FIG. 3 is provided as an example. Other examples may differ from that which is described in FIG. 3.

Figure 4:
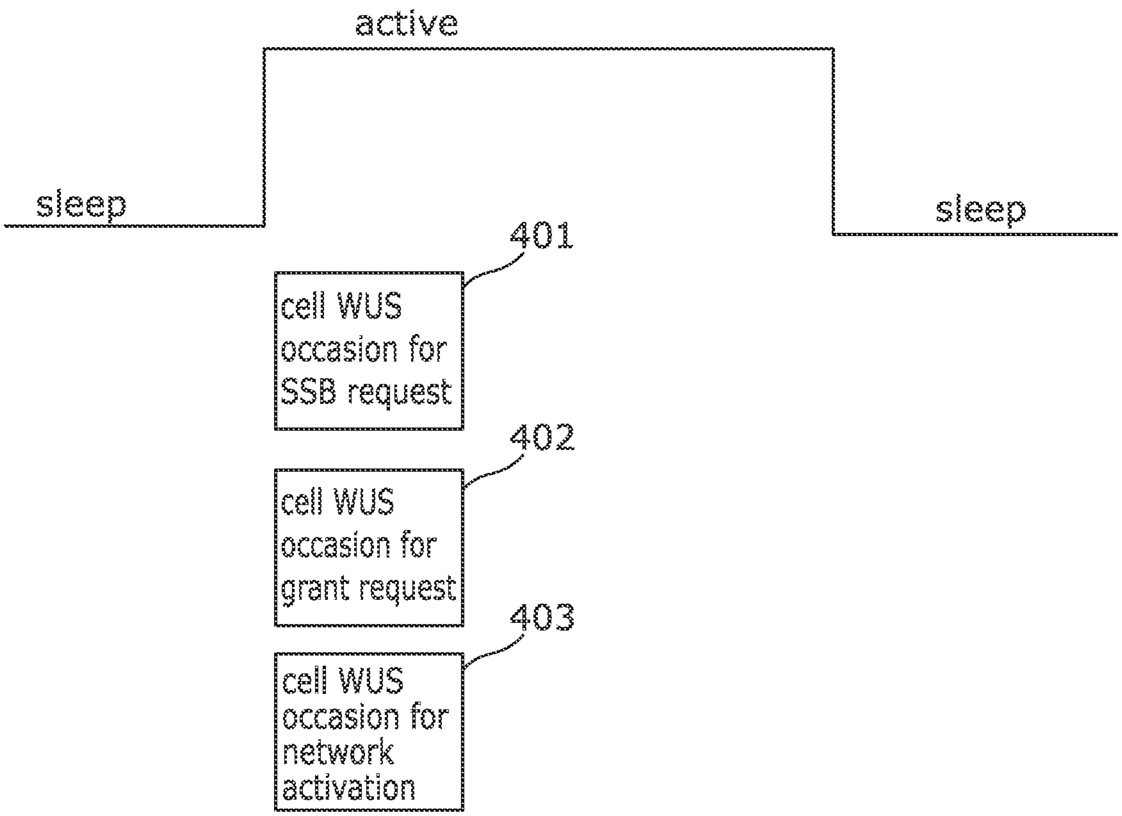
FIG. 4 is a representation of multiple cell wake up signaling occasions for different user equipment requests, in accordance with one embodiment of the present invention.

FIG. 4 shows an example wherein there are three cell WUS occasions, each with a different function. If the UE wants to send a Synchronization Signal Block (SSB) request, it sends the request in WUS occasion 401, in accordance with the function of cell WUS occasion 401 being associated with SSB requests. If the UE wants a grant, it can send its request in WUS occasion 402, in accordance with the function of cell WUS occasion 402 being associated with grant requests. If the UE wants a network activation, it sends a request in WUS occasion 403, in accordance with the function of cell WUS occasion 403 being associated with network activation requests. Two or more of these requests can be made simultaneously using the same time-frequency resources.

If for example, PRACH is used to transmit the wake up signal, it can transmit one bit. So in the embodiment of FIG. 4, the UE can transmit one bit in WUS occasion 401, one bit in WUS occasion 402 and one bit in WUS occasion 403. So in total, three bits can be transmitted. The interpretation of the one or more bits received in each occasion will be different to convey different information. In one example, wherein a one bit indication may be transmitted in each WUS occasion, WUS occasion 403 may be used to wake up the network. In this case, 0 may mean don't wake up and 1 may mean wake up. In the case of WUS occasion 401, which is used in the example of FIG. 4 for SIB requests, 0 may mean don't send SIB while 1 may mean send SIB.

FIG. 4 is provided as an example. Other examples may differ from that which is described in FIG. 4.

Figure 5:
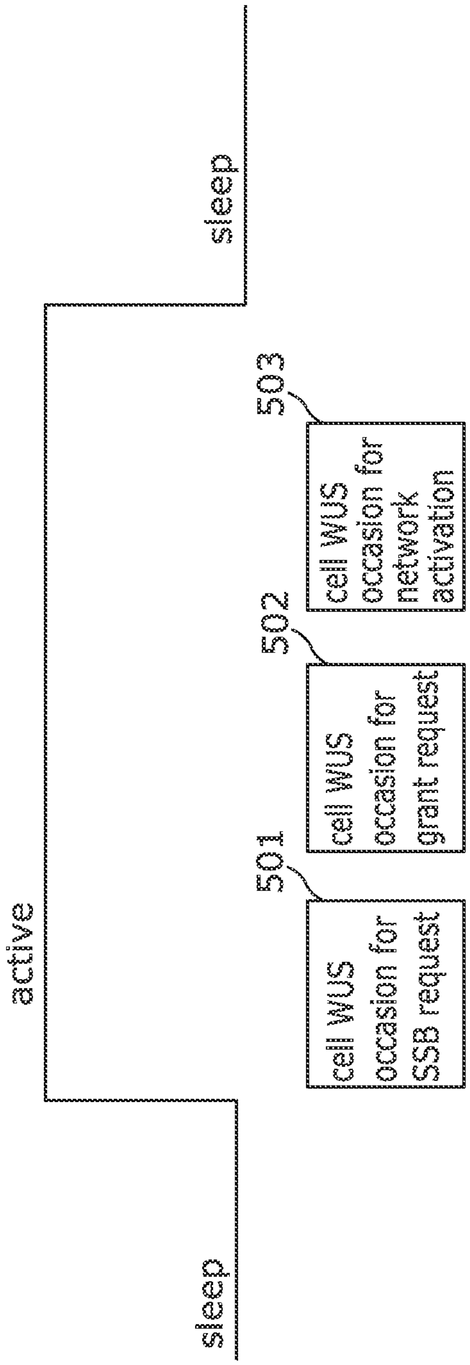
FIG. 5 is a representation of multiple cell wake up signaling occasions for different user equipment requests, in accordance with one embodiment of the present invention.

In the embodiment shown in FIG. 4, the multiple occasions are multiplexed in the time domain, e.g. they are time-division multiplexed (TDM). In alternative embodiments, for example as shown in the embodiment of FIG. 5, the multiple occasions can be multiplexed in the frequency domain, e.g. they can be frequency-division multiplexed (FDM). In FIG. 5 If the UE wants to send a SSB request, it sends the request in WUS occasion 501. If the UE wants a grant, it can send its request in WUS occasion 502. If the UE wants a network activation, it sends a request in WUS occasion 503. In further embodiments, a combination of TDM and FDM may be used.

FIG. 5 is provided as an example. Other examples may differ from that which is described in FIG. 5.

The different WUS occasions may have different configurations depending on their usage. The usage may include TPC, power control, power ramping step, beam or spatial filter, preambles and preamble groups. For example, separate power control may be configured for each cell WUS occasion, for example, how much power is allowed to be transmitted. If a UE fails to transmit a signal, a power ramping step or power increment may be required. The configuration may be include which preamble to use to transmit the WUS, or which groups of preambles etc. So across all the WUS occasions, the configuration of each WUS could be different.

This can be used to utilize different priorities for different requests transmitted on different WUS occasions. For example, when the UE asks for a SSB in WUS occasion 401 of FIG. 4, that UE could be given a higher priority over another UE requesting network activation in WUS occasion 403. Therefore the UE transmitting the SSB request can use higher power than used to transit the network activation request.

One or more cell WUS occasions can be defined to collectively signal multiple requests. For example, certain WUS occasions can be used to transmit a request to the network to send two or more or of SSB, SIB1 and ask for a grant. An example of aggregating requests in this way is demonstrated in FIG. 6 wherein in addition to the single-request WUS occasions, 601, 602 and 603, which are equivalent to those of FIG. 4, the network configures a WUS occasion 604 which can be used to transmit two or more requests. For example, if the UE wants to transmit a SSB request, it can use WUS occasion 601, if it wants to transmit a grant request it can use WUS occasion 602, but if it wants to send both an SSB request and ask for a grant, it can use WUS occasion 604. Using occasion 604, only one bit needs to be transmitted. The single bit will be interpreted by the network as a request for both SSB and a grant. This type of WUS occasion can save energy at the UE side since the UE doesn't have to transmit multiple requests over multiple WUS occasions. Instead a specific cell WUS occasion is defined for aggregated requests. In some examples, each active period of the network entity may have one or more of these aggregated request WUS occasions configured.

Figure 6:
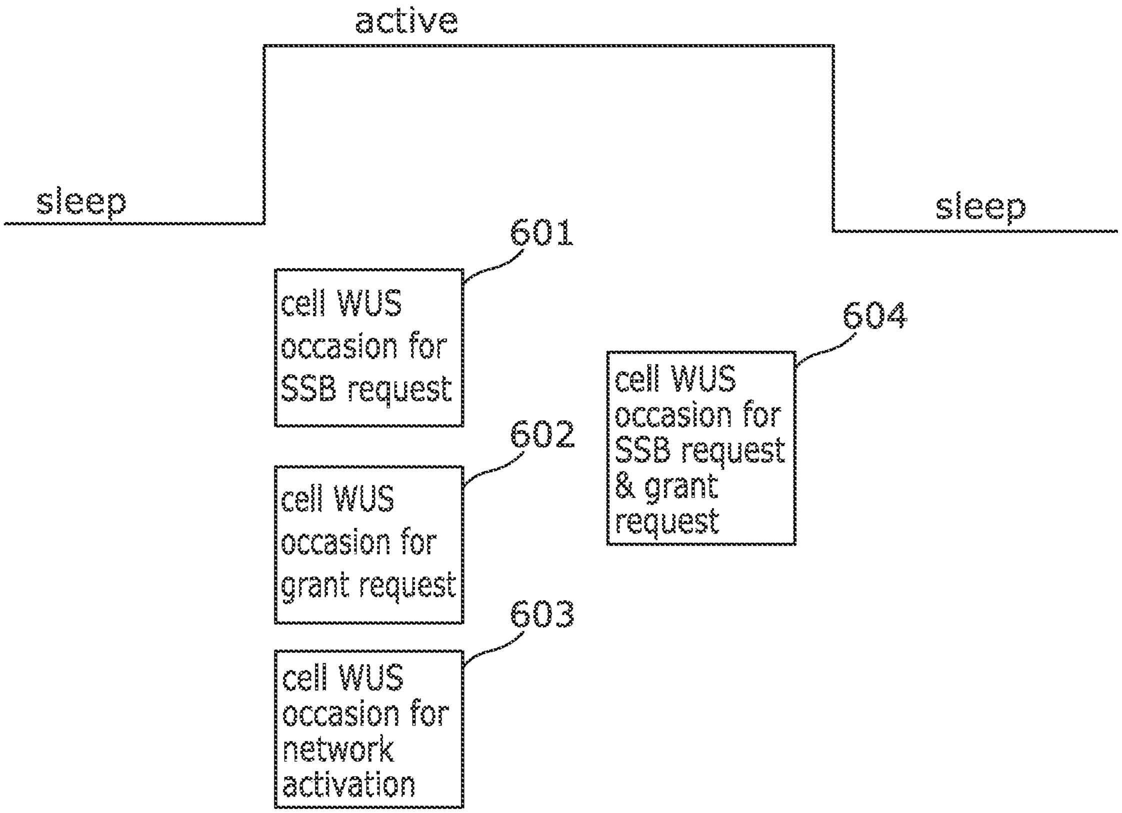
FIG. 6 is a representation of multiple cell wake up signaling occasions for different user equipment requests, in accordance with one embodiment of the present invention.

The UE may transmit a request multiple times using different cell WUS occasions. Referring again to FIG. 6, the network will listen to all of cell WUS occasions 601-604 regardless of whether any UE is transmitting in any of the cell WUS occasions. If the UE has no power concerns, it may wish to transmit not only in cell WUS 604, but also in cell WUS 601 and cell WUS 602, thereby transmitting the request for SSB twice (once in individual request cell WUS 601 and once in aggregated requests cell WUS 604) and the request for a grant twice (once in individual request cell WUS 602 and again in multiple requests cell WUS 604). This can be useful to insure higher reliability of detection at the network side. But for a UE with power concerns, cell WUS 604 alone could be used. FIG. 6 is provided as an example. Other examples may differ from that which is described in FIG. 6.

Each of the plurality of cell wake up signaling occasions has an associated periodicity. Each of the plurality of cell wake up occasions may have a different latency or periodicity. Since different requests might have different latency or periodicity, not all WUS occasions are available with the same periodicity. Therefore each cell WUS occasion may be configured with different periodicity. Each cell WUS occasion may be configured with different periodicity based on its associated request/purpose/function.

In a non-limiting example, the cell WUS occasions that can be used to request the network to be active may be more frequent than WUS occasions associated with other requests/purposes. Other WUS occasions associated with other requests/purposes can be configured to be present less frequently, for example every other active cycle. The network may configure the periodicity of each cell WUS occasion, based on how often the function associated with the WUS occasion is likely to be required by a UE.

Figure 7:
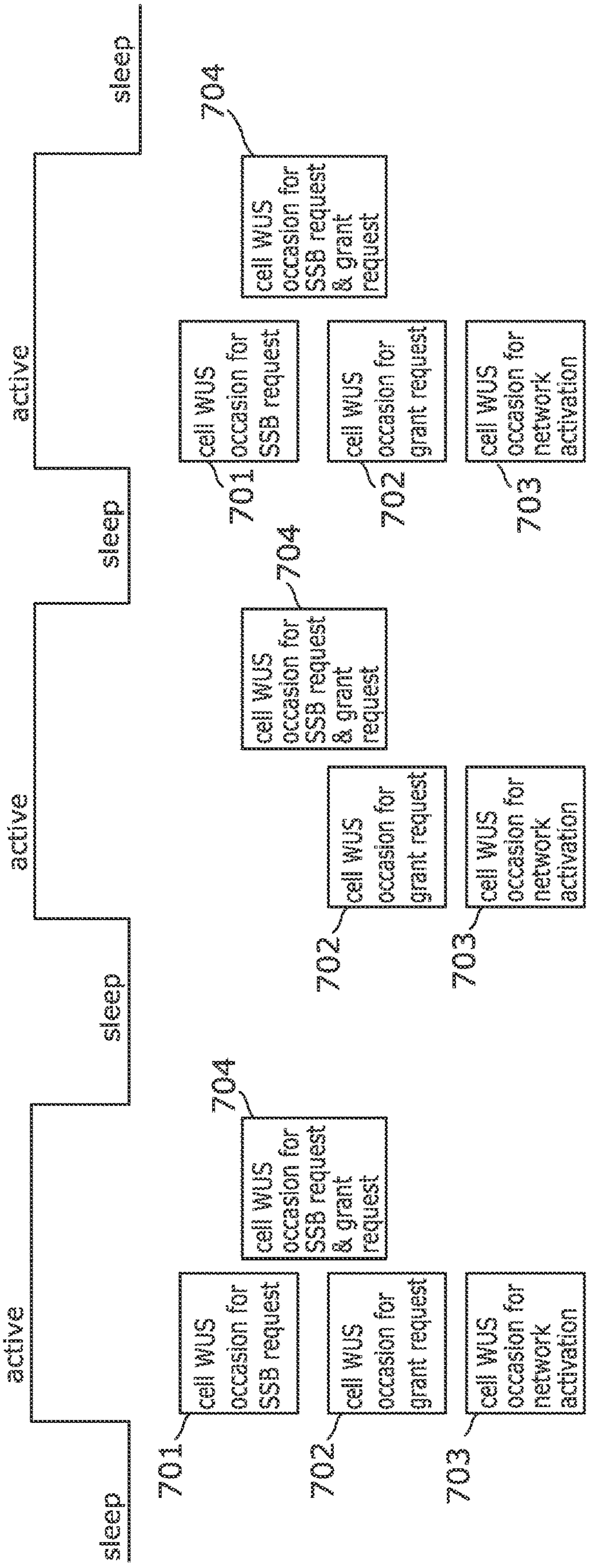
FIG. 7 is a representation of multiple cell wake up signaling occasions for different user equipment requests, in accordance with one embodiment of the present invention.

An example embodiment is shown in FIG. 7. In the first active period, four cell WUS occasions 701, 702, 703, 704 are provided. In the subsequent active period, only three of the four UWS occasions are provided, 702, 703 and 704. In the next active period, all four cell WUS occasions 701, 702, 703, 704 are again provided.

This reduces interference which can occur if every UE is allocated time frequency resources to transmit every type of request every active period. A neighboring network entity might not use resources allocated for cell WUS occasion 701 to avoid interference if it know that the network entity of FIG. 7 has resources reserved for cell WUS occasion 701 every active period. But if in the next active period, the neighboring network entity is aware that those resources are not reserved, it can use them without risk of interference. FIG. 7 is provided as an example. Other examples may differ from that which is described in FIG. 7.

Reception at the network side doesn't use much energy, compared to energy usage associated with the transmission of wake up signaling. The network may have one response message to all the different WUS occasions, thereby avoiding having to respond to each request separately.

It will be appreciated that the present invention permits existing PRACH and SR signaling to be used to signal different requests even if PRACH and SR can't send more than one bit. No new waveform or channel is required, for example to transmit three bits where three requests are being sent by the UE. A further benefit is a simpler network receiver can be used as different purposes are split across multiple occasions. Having one receiver that can detect three bits is more complicated that having three receivers, for example three PRACH receivers, each able to detect one bit. To detect three bits, a baseband detector would be required, with its full RX path active. By using the preamble to transmit a signal, the RX path is not required, instead a simple correlator can be used to work out which preamble is being transmitted, resulting in a much simpler PRACH receiver. A further benefit is reduced collision. Where only one cell WUS occasion is provided for any wake up signaling/any purpose, there is an increased chance of multiple UEs transmitting in the same occasion. This is reduced where multiple occasions are provided.

The configuration of a plurality of cell wake up signaling occasions can be a function of the sleep mode. For example, light sleep mode may be associated with one cell WUS periodicity while deep sleep mode may be associated with another cell WUS periodicity.

Figure 8:
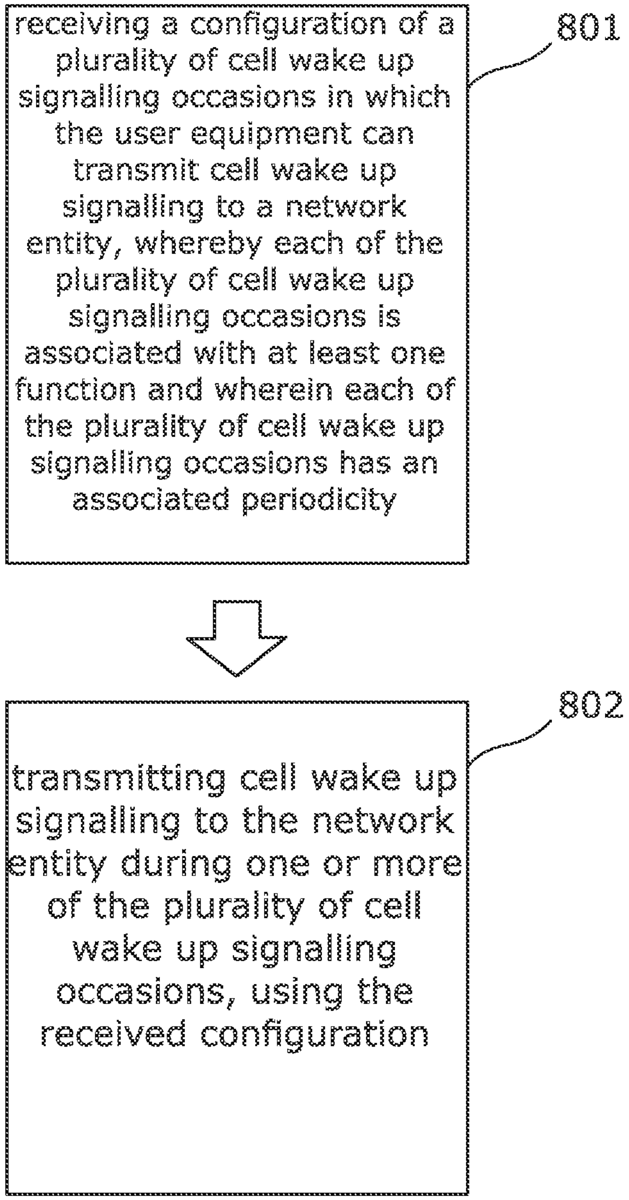
FIG. 8 is a representation of a method for communication by a user equipment, in accordance with the present invention.

FIG. 8 is a representation of a method for communication by a user equipment, in accordance with the present invention. In step 801, the UE receives a configuration of a plurality of cell wake up signaling occasions in which the user equipment can transmit cell wake up signaling to a network entity, whereby each of the plurality of cell wake up signaling occasions is associated with at least one function, and wherein each of the plurality of cell wake up signaling occasions has an associated periodicity. In step 802, the UE transmits cell wake up signaling to the network entity during one or more of the plurality of cell wake up signaling occasions, using the received configuration.

If the configuration comprises a first wake up signaling occasion associated with a first function and at a second wake up signaling occasion associated with a second function, wherein the first function and the second function are different, the UE may use the first wake up signaling occasion to transmit wake up signaling associated with the first function, for example a scheduling request requesting an uplink grant. Alternatively or additionally, the UE may use the second wake up signaling occasion to transmit wake up signaling associated with the second function, for example a request for a Synchronization Signal Block. In this way, the transmitted cell wake up signaling may comprise one or a plurality of requests of the network entity.

As the each of the plurality of cell wake up signaling occasions is associated with at least one function, it is possible for at least one of the cell WUS occasions to be associated with multiple functions. If so, the UE may transmit a plurality of requests in that wake up occasion that is associated with multiple functions. Otherwise, if a plurality of requests are to be transmitted, they may be transmitted simultaneously using different cell WUS occasions. The same cell wake up signaling may be transmitted in two or more of the plurality of cell wake up occasions. The UE may receive a single response message from the network entity regardless of the number of requests made by the cell wake up signaling.

The cell wake up signaling may comprise a one bit indication, or multiple one bit indications, which are transmitted over a physical random access channel (PRACH). The network entity may be configured to interpret one or more bits received in each occasion differently to determine the information being conveyed.

Figure 9:
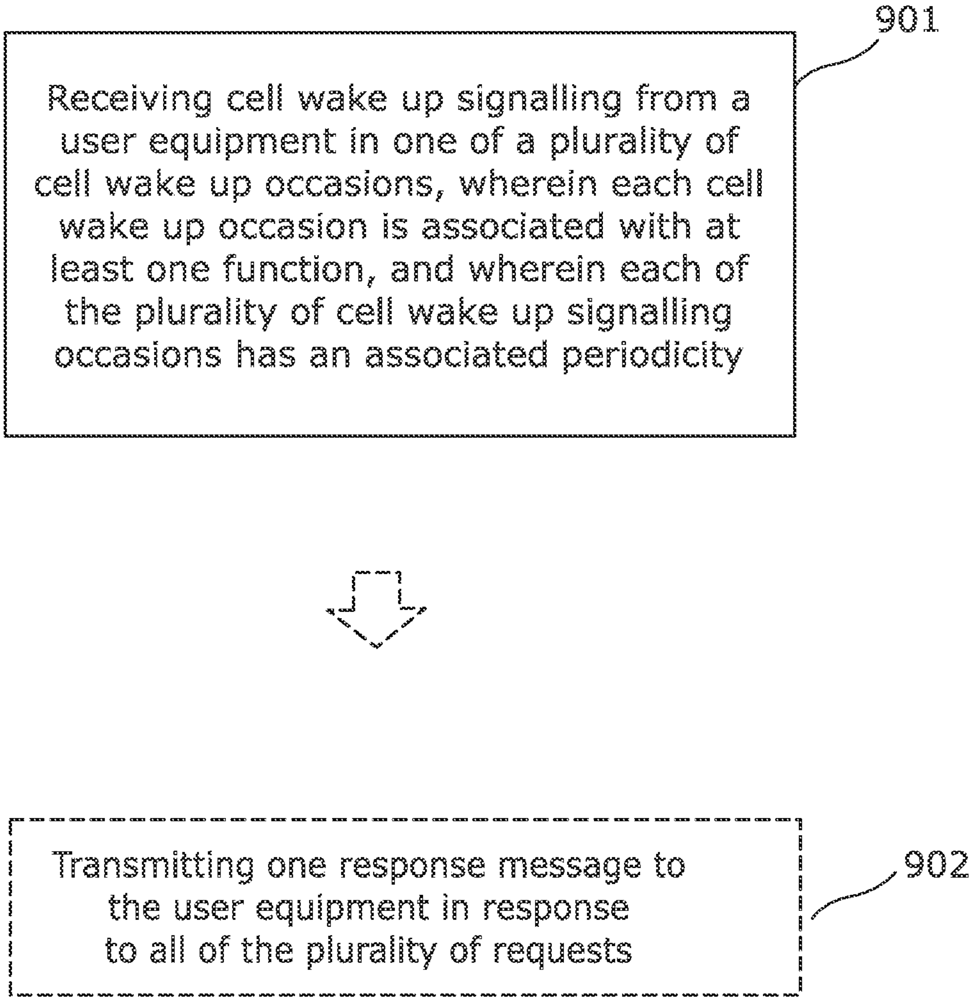
FIG. 9 is a representation of a method for communication by a network entity, in accordance with the present invention.

FIG. 9 is a representation of a method for communication by a network entity in accordance with the present invention. In step 901 the network entity receives cell wake up signaling from a user equipment in one of a plurality of cell wake up signaling occasions. Each cell wake up signaling occasion is associated with at least one function and each of the plurality of cell wake up signaling occasions has an associated periodicity. The network entity may receive the cell wake up signaling over a physical random access channel (PRACH). The cell wake up signaling may comprise a one bit indication, or multiple one bit indications. The network entity may be configured to interpret one or more bits received in each occasion differently to determine the information being conveyed.

If the network entity determines that the wake up signaling conveys a scheduling request requesting an uplink grant, the network entity provides an uplink grant. If the network entity determines that the wake up signaling conveys a request for the network entity to move from an inactive state to an active state, the network entity moves to an active state. If the network entity determines that the wake up signaling conveys a request for a Synchronization Signal Block, the network entity provides a Synchronization Signal Block. If the network entity determines that the wake up signaling conveys a request for a System Information Block #1, the network entity provides a System Information Block #1.

Optionally, the method further comprises, in step 902, the step of transmitting one response message to the user equipment in response to all requests made by the wake up signaling.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, “or” as used in a list of items (e.g., a list of items prefaced by a phrase such as “at least one of” or “one or more of”) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an exemplary step that is described as “based on condition A” may be based on both a condition A and a condition B without departing from the scope of the present disclosure. In other words, as used herein, the phrase “based on” shall be construed in the same manner as the phrase “based at least in part on.”

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term “exemplary” used herein means “serving as an example, instance, or illustration,” and not “preferred” or “advantageous over other examples.” The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method for communication by a user equipment, the method comprising:

receiving a configuration of a plurality of cell wake up signaling occasions in which the user equipment can transmit cell wake up signaling to a network entity, whereby each of the plurality of cell wake up signaling occasions is associated with at least one function, wherein the plurality of cell wake up signaling occasions comprise a first wake up signaling occasion associated with a first function and at a second wake up signaling occasion associated with a second function, wherein the first function and the second function are different, and wherein each of the plurality of cell wake up signaling occasions has an associated periodicity; and transmitting cell wake up signaling to the network entity during one or more of the plurality of cell wake up signaling occasions, using the received configuration.

2. The method of claim 1, wherein the at least one function is associated with at least one of:

a scheduling request requesting an uplink grant;

a request for the network entity to move from an inactive state to an active state;

a request for a Synchronization Signal Block; or a request for a System Information Block #1.

3. The method of claim 1, wherein at least one of the plurality of cell wake up signaling occasions is associated with a plurality of functions.

4. The method of claim 1, wherein the transmitted cell wake up signaling comprises a plurality of requests of the network entity.

5. The method of claim 4, wherein each of the plurality of requests is transmitted in a different cell wake up occasion of the plurality of cell wake up occasions.

6. The method of claim 4, wherein at least two of the plurality of requests are transmitted in the same cell wake up occasion of the plurality of cell wake up occasions.

7. The method of claim 4, wherein at least two of the plurality of requests are transmitted simultaneously.

8. The method of claim 1, wherein transmitting cell wake up signaling to a wireless network comprises transmitting at least one one bit indication.

9. The method of claim 1, wherein the cell wake up signaling is transmitted over a physical random access channel.

10. The method of claim 1, wherein the cell wake up signaling comprises at least one of:

a scheduling request requesting an uplink grant;

a request for the network entity to move from an inactive state to an active state;

a request for a Synchronization Signal Block; or a request for a System Information Block #1.

11. The method of claim 1, wherein transmitting the cell wake up signaling comprises transmitting the cell wake up signaling in a cell wake up occasion having a function associated with a type of cell wake up signaling to be transmitted.

12. The method of claim 1, wherein the periodicity of at least one of the plurality of cell wake up signaling occasions aligns with a periodicity of active periods of the network entity.

13. The method of claim 1, wherein each of the plurality of cell wake up occasions has a different power control configuration.

14. The method of claim 1, wherein each of the plurality of cell wake up occasions has a different priority.

15. The method of claim 1, wherein at least two of the plurality of cell wake up occasions have a different periodicity.

16. The method of claim 1, wherein at least one of the plurality of cell wake up occasions is configured in each active period of the network entity.

17. The method of claim 1 or claim 16, wherein at least one of the plurality of cell wake up occasions is configured in alternate active periods of the network entity.

18. The method of claim 1, wherein a cell wake up signaling occasion that can be used by the UE to request the network to move from an inactive state to an active state is configured in each active period of the network entity.

19. The method of claim 1, wherein a cell wake up signaling occasion that can be used by the user equipment to request at least one of:

an uplink grant;

a Synchronization Signal Block; or a System Information Block #1, is configured in alternate active periods of the network entity.

20. The method of claim 1, further comprising receiving one response message from the network entity in response to all of the plurality of requests.

21. A non-transitory computer-readable medium storing instructions which, when executed by a computer, cause the computer to perform the method of claim 1.

22. A method for communication by a network entity, the method comprising:

receiving cell wake up signaling from a user equipment in one of a plurality of cell wake up occasions, wherein the plurality of cell wake up signaling occasions comprise a first wake up signaling occasion associated with a first function and at a second wake up signaling occasion associated with a second function, wherein the first function and the second function are different, wherein each cell wake up occasion is associated with at least one function, and wherein each of the plurality of cell wake up signaling occasions has an associated periodicity.

23. The method of claim 22, wherein the cell wake up signaling comprises a plurality of requests of the network entity.

24. The method of claim 22, wherein each of the plurality of requests is received in a different cell wake up occasion of the plurality of cell wake up occasions.

25. The method of claim 22, wherein receiving cell wake up signaling from the user equipment comprises receiving at least one one bit indication.

26. The method of claim 22, further comprising transmitting one response message to the user equipment in response to all of the plurality of requests.

27. A user equipment comprising:

means for receiving a configuration of a plurality of cell wake up signaling occasions in which the user equipment can transmit cell wake up signaling to a network entity, whereby each of the plurality of cell wake up signaling occasions is associated with at least one function, wherein the plurality of cell wake up signaling occasions comprise a first wake up signaling occasion associated with a first function and at a second wake up signaling occasion associated with a second function, wherein the first function and the second function are different, and wherein each of the plurality of cell wake up signaling occasions has an associated periodicity; and means for transmitting cell wake up signaling to the network entity during one or more of the plurality of cell wake up signaling occasions, using the received configuration.

28. A network entity, comprising:

means for receiving cell wake up signaling from a user equipment in one of a plurality of cell wake up occasions, wherein each cell wake up signaling occasion associated with at least one function, wherein the plurality of cell wake up signaling occasions comprise a first wake up signaling occasion associated with a first function and at a second wake up signaling occasion associated with a second function, wherein the first function and the second function are different, and wherein each of the plurality of cell wake up signaling occasions has an associated periodicity.

* * * * *